United States Patent
Sengstaken, Jr.

(10) Patent No.: US 11,250,652 B2
(45) Date of Patent: Feb. 15, 2022

(54) SMART DELIVERY RECEPTACLE AND RELATED SYSTEMS AND METHODS

(71) Applicant: PDT SYSTEMS, LLC, Buford, GA (US)

(72) Inventor: Robert William Sengstaken, Jr., Hollis, NH (US)

(73) Assignee: PDT SYSTEMS, LLC, Buford, GA (US)

( * ) Notice: Subject to any disclaimer, the term of this patent is extended or adjusted under 35 U.S.C. 154(b) by 139 days.

(21) Appl. No.: 16/668,439

(22) Filed: Oct. 30, 2019

(65) Prior Publication Data

US 2020/0134948 A1 Apr. 30, 2020

Related U.S. Application Data

(60) Provisional application No. 62/752,994, filed on Oct. 30, 2018.

(51) Int. Cl.
*G07C 9/00* (2020.01)
*G06K 7/10* (2006.01)
*G06Q 10/08* (2012.01)

(52) U.S. Cl.
CPC ..... *G07C 9/00182* (2013.01); *G06K 7/10297* (2013.01); *G06K 7/10316* (2013.01); *G06K 7/10366* (2013.01); *G06Q 10/0836* (2013.01)

(58) Field of Classification Search
None
See application file for complete search history.

(56) References Cited

U.S. PATENT DOCUMENTS

| | | | | |
|---|---|---|---|---|
| 5,150,834 A | * | 9/1992 | Bourke | A47G 29/1203 232/1 C |
| 6,650,240 B2 | * | 11/2003 | Lee | G01V 15/00 235/385 |
| 6,725,127 B2 | * | 4/2004 | Stevens | A47G 29/141 700/225 |
| 9,969,494 B1 | * | 5/2018 | Buchmueller | G05D 1/0858 |
| 10,292,519 B1 | * | 5/2019 | Sutton | A47G 29/1209 |
| 2002/0017990 A1 | * | 2/2002 | Okamura | G06Q 10/08 340/572.1 |
| 2002/0035857 A1 | * | 3/2002 | Stein | A47G 29/141 70/277 |

(Continued)

*Primary Examiner* — Curtis J King
(74) *Attorney, Agent, or Firm* — Hayes Soloway PC

(57) ABSTRACT

A smart delivery receptacle and related systems and techniques are disclosed. The disclosed receptacle may be configured to detect and securely report wirelessly on whether a package has been delivered thereto. Moreover, the disclosed receptacle may be configured to alert an owner or other authorized party if the receptacle has been compromised or a package has been removed without authorization. To such ends, the disclosed receptacle may include RF wireless communication device(s) configured to transmit RF signal(s) including data pertaining to various conditions to be monitored. Information from the RF signal(s) may be delivered through the internet to a server, which may be cloud-based in some instances, allowing for inter-networking of the system components and other elements as part of the internet of things (IOT). Mobile and other computing devices may access the information stored at the server to monitor the receptacle, as well as control overall system operation.

25 Claims, 8 Drawing Sheets

(56) References Cited

U.S. PATENT DOCUMENTS

| | | | | |
|---|---|---|---|---|
| 2002/0067261 | A1* | 6/2002 | Kucharczyk | G07C 9/21 340/568.1 |
| 2002/0183882 | A1* | 12/2002 | Dearing | G06Q 10/08 700/115 |
| 2003/0230124 | A1* | 12/2003 | Johnson | E05B 47/00 70/267 |
| 2003/0231112 | A1* | 12/2003 | Raju | A47G 29/141 340/569 |
| 2005/0134433 | A1* | 6/2005 | Sweeney | G06K 7/10336 340/10.1 |
| 2006/0208881 | A1* | 9/2006 | Suzuki | G16H 10/40 340/539.27 |
| 2007/0001809 | A1* | 1/2007 | Kodukula | G06K 7/10346 340/10.1 |
| 2008/0245791 | A1* | 10/2008 | Atherton | B65D 55/06 220/200 |
| 2008/0277594 | A1* | 11/2008 | Wagner | G21F 5/018 250/432 PD |
| 2009/0109040 | A1* | 4/2009 | MacLean, III | G21F 5/06 340/600 |
| 2009/0201198 | A1* | 8/2009 | Moudy | G06Q 10/087 342/357.75 |
| 2010/0251785 | A1* | 10/2010 | Zarei | B65D 90/008 70/58 |
| 2014/0014008 | A1* | 1/2014 | Tompkins | E05G 1/02 109/23 |
| 2015/0102903 | A1* | 4/2015 | Wilkinson | A47G 29/141 340/5.61 |
| 2017/0124510 | A1* | 5/2017 | Caterino | G07C 9/00896 |
| 2017/0147975 | A1* | 5/2017 | Natarajan | G05D 1/0676 |
| 2017/0213187 | A1* | 7/2017 | Choi | A47G 29/141 |
| 2018/0092484 | A1* | 4/2018 | Lewis | A47G 29/20 |
| 2018/0228311 | A1* | 8/2018 | Bloom | B64C 39/024 |
| 2019/0000255 | A1* | 1/2019 | Dehner | A47G 29/20 |
| 2019/0130348 | A1* | 5/2019 | Mellado | G07C 9/00912 |
| 2019/0235527 | A1* | 8/2019 | O'Brien | G05D 1/0204 |
| 2019/0239673 | A1* | 8/2019 | Silva | A47G 29/141 |
| 2019/0347612 | A1* | 11/2019 | Anders | G06Q 10/0833 |
| 2020/0051015 | A1* | 2/2020 | Davis | G06Q 10/0833 |
| 2020/0060460 | A1* | 2/2020 | Farrar | A47G 29/141 |
| 2020/0077826 | A1* | 3/2020 | Chenier | G07C 9/00309 |
| 2020/0288895 | A1* | 9/2020 | Bennet | H04W 12/08 |
| 2020/0323377 | A1* | 10/2020 | O'Connor | A47G 29/20 |
| 2020/0359819 | A1* | 11/2020 | Roberts | A47G 29/16 |
| 2020/0387863 | A1* | 12/2020 | Ruth | G06Q 10/087 |
| 2020/0397172 | A1* | 12/2020 | Kennett | E05B 65/52 |
| 2021/0022536 | A1* | 1/2021 | Anderson | A47G 29/141 |
| 2021/0132625 | A1* | 5/2021 | Gillett | G05D 1/0278 |

\* cited by examiner

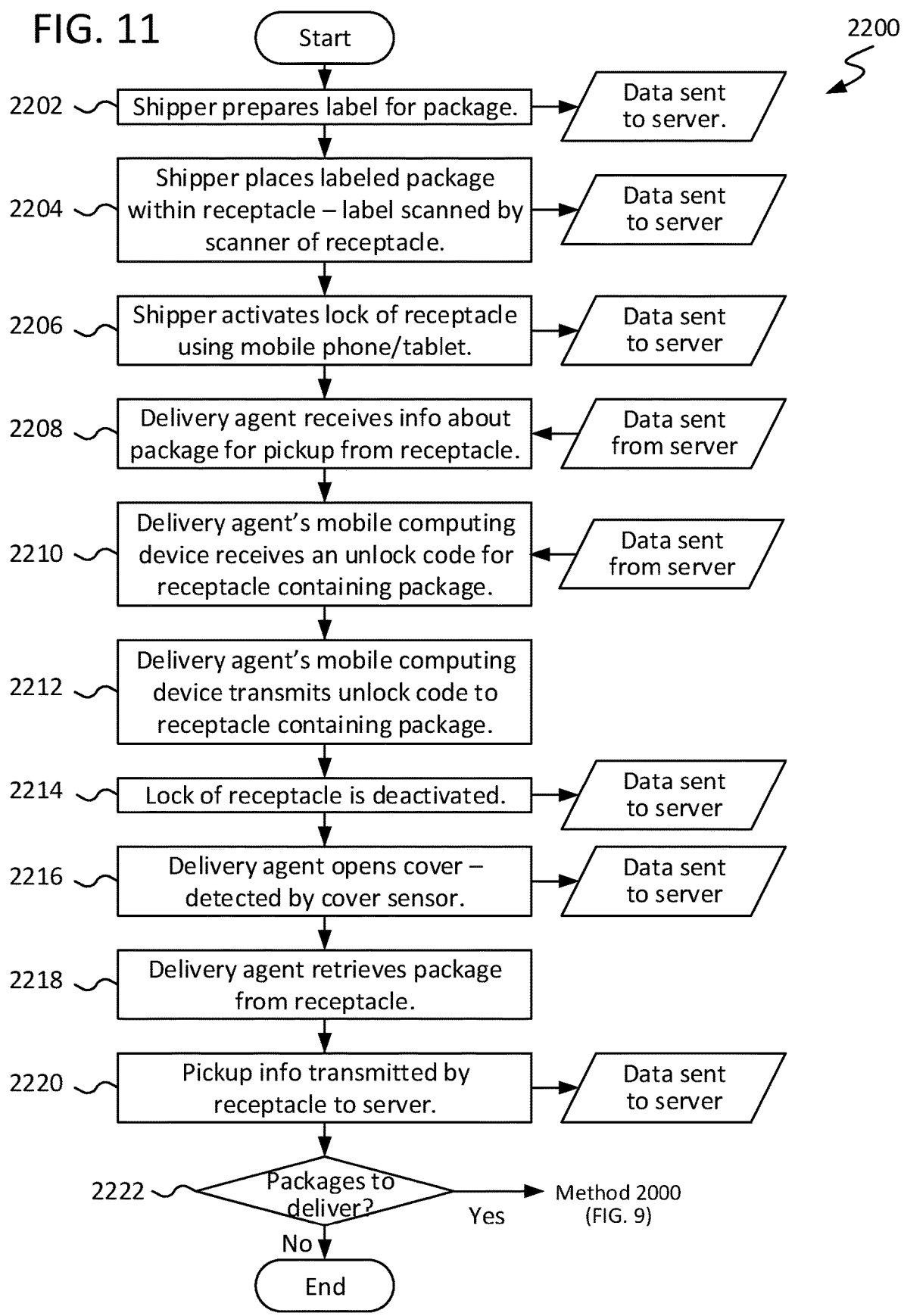

SMART DELIVERY RECEPTACLE AND RELATED SYSTEMS AND METHODS

CROSS-REFERENCE TO RELATED APPLICATIONS

This patent application claims the benefit of U.S. Provisional Patent Application No. 62/752,994, filed on Oct. 30, 2018, which is herein incorporated by reference in its entirety.

FIELD OF THE DISCLOSURE

The present disclosure relates to packaged delivery infrastructure and systems and, more particularly, to a smart delivery receptacle and related systems and methods.

BACKGROUND

With modern package delivery boxes, sometimes called drop boxes or parcel boxes, a main door is opened so that the package may be placed in the box and, when the door is closed, the package drops or moves into a different compartment. That separate compartment is generally inaccessible through the main door and is accessible only through a separate locked door, which may be opened by the owner or other authorized party having the associated key.

SUMMARY

The subject matter of this application may involve, in some cases, interrelated products, alternative solutions to a particular problem, and/or a plurality of different uses of a single system or article.

One example embodiment provides a delivery receptacle. The delivery receptacle includes: a body portion configured to receive a package therein; a cover portion configured to engage the body portion; and a lock configured to lock the cover portion in engagement with the body portion. The delivery receptacle further includes a first electronics assembly including: a scanner configured to scan a label of the package; a first wireless communication device configured to transmit a first radio frequency (RF) signal including data pertaining to delivery information obtained from the label scanned by the scanner, wherein the first RF signal is a Wi-Fi signal or a cellular signal; a second wireless communication device configured to communicate with a mobile computing device within range to effectuate locking and unlocking of the lock; and a first processor configured to instruct the first wireless communication device to transmit the first RF signal. In some cases, the scanner is a radio-frequency identification (RFID) scanner. In some such instances, the first electronics assembly further includes a first RFID antenna communicatively coupled with the RFID scanner and disposed on a first interior wall of either the body portion or the cover portion. In some such instances, the first electronics assembly further includes a second RFID antenna communicatively coupled with the RFID scanner and disposed on a second interior wall of either the body portion or the cover portion. In some cases, the scanner is a barcode scanner. In some cases, the scanner is configured to scan the label of the package when the package is disposed within the body portion. In some cases, the first electronics assembly further includes a lock sensor configured to detect whether the lock is locked or unlocked. In some cases, the first wireless communication device is further configured to transmit in the first RF signal data pertaining to at least one of: detected tampering with the cover portion or body portion; detected tampering with the lock; and detected unauthorized removal of the package from the delivery receptacle. In some cases, the delivery information includes at least one of a package ID, a time of delivery of the package, and a delivery agent ID. In some cases, the first RF signal further includes data pertaining to whether the lock is locked or unlocked. In some cases, the second wireless communication device is configured to receive a near-field communication (NFC) signal from the mobile computing device. In some cases, the second wireless communication device is configured to receive a Bluetooth signal from the mobile computing device. In some cases, the first electronics assembly further includes a third wireless communication device configured to transmit a second RF signal, wherein the second RF signal is a Bluetooth signal. In some cases: the first electronics assembly further includes a power supply; and the first wireless communication device is further configured to transmit in the first RF signal data pertaining to a remaining power level of the power supply. In some cases, the first electronics assembly further includes an alarm configured to emit at least one of a visual alarm and an audio alarm in response to at least one of: detected tampering with the cover portion or body portion; detected tampering with the lock; and detected unauthorized removal of the package from the delivery receptacle.

In some cases, a system is provided, the system including the delivery receptacle and a tether system including: a tether configured to interface with a package external to the delivery receptacle; an attachment point disposed external to the delivery receptacle and configured to have the tether engage therewith; and a stowage mechanism configured to stow the tether. In some instances, the tether is a line including a netting material configured to expand out over the package external to the delivery receptacle when deployed. In some instances, the tether includes an electrically conductive trace which is configured to be electrically coupled with the first electronics assembly to form a circuit when the tether engages with the attachment point. In some instances, the first wireless communication device is further configured to transmit in the first RF signal data pertaining to at least one of: a breakage of the tether; an unauthorized disengagement of the tether from the attachment point; and an unauthorized removal of the package interfaced with the tether. In some instances, the tether system further includes a tether sensor configured to detect whether the tether is engaged or disengaged with respect to the attachment point. In some instances, the stowage mechanism includes a rotary encoder configured to detect whether the tether retracts or advances in length.

In some cases, a system is provided, the system including the delivery receptacle and a pressure pad system. The pressure pad system includes: a pressure pad configured to have disposed thereon a package external to the delivery receptacle; and a second electronics assembly. The second electronics assembly includes: a pressure sensor configured to detect a weight of the package disposed on the pressure pad; a fourth wireless communication device configured to transmit a third RF signal in communication with the third wireless communication device, wherein the third RF signal is a Bluetooth signal; and a second processor configured to instruct the fourth wireless communication device to transmit the third RF signal. In some instances, the third RF signal includes data pertaining to whether the package external to the delivery receptacle is disposed on the pressure pad. In some instances, the fourth wireless communication device is further configured to transmit in the third RF signal data pertaining to at least one of: detected tampering with the pressure pad; and detected unauthorized removal of the package from the pressure pad. In some instances, the first wireless communication device is further configured to transmit in the first RF signal the data pertaining to at least one of: detected tampering with the pressure pad; and detected unauthorized removal of the package from the pressure pad.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 11 is a flow diagram illustrating a method of preparing and retrieving a package for pickup from a delivery receptacle, in accordance with an embodiment of the present disclosure.

Figure 1:
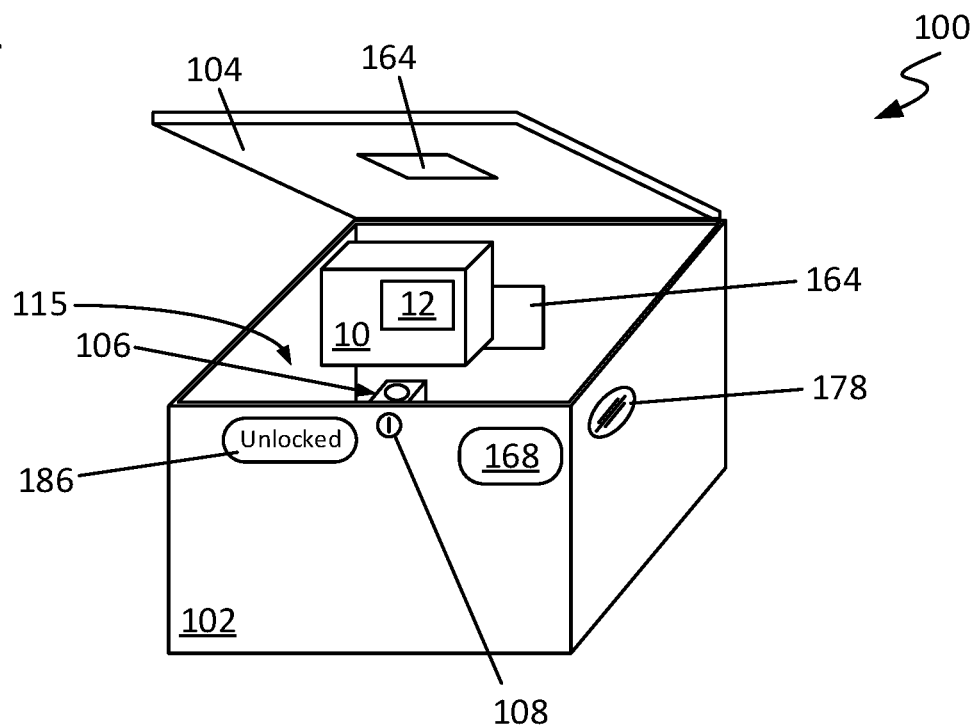
FIGS. 1-2 illustrate several views of a delivery receptacle configured in accordance with an embodiment of the present disclosure.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

A smart delivery receptacle and related systems and techniques are disclosed. The disclosed receptacle may be configured, in accordance with some embodiments, to detect and securely report wirelessly on whether a package has been delivered thereto. Moreover, the disclosed receptacle may be configured, in accordance with some embodiments, to alert an owner or other authorized party if the receptacle has been compromised or a package has been removed without authorization. To such ends, the disclosed receptacle may include one or more radio frequency (RF) wireless communication devices configured to transmit RF signal(s) including data pertaining to various conditions to be monitored. Information from the RF signal(s) may be delivered through the internet to a server, which may be cloud-based in some instances, allowing for inter-networking of the system components and other elements as part of the internet of things (IOT). Mobile and other computing devices may access the information stored at the server to monitor the receptacle, as well as control overall system operation. Numerous configurations and variations will be apparent in light of this disclosure.

General Overview

Theft of unattended packages delivered at consumer residences and office buildings is a persistent problem, particularly in this age of online shopping. Moreover, if an intended recipient or sender wishes to file an insurance claim or seek redress for loss or theft of a package, there can be difficulties in proving that delivery, in fact, was made at the intended address.

Thus, and in accordance with some embodiments of the present disclosure, a smart delivery receptacle and related systems and techniques are disclosed. The disclosed receptacle may be configured, in accordance with some embodiments, to detect and securely report wirelessly on whether a package has been delivered thereto. Moreover, the disclosed receptacle may be configured, in accordance with some embodiments, to alert an owner or other authorized party if the receptacle has been compromised or a package has been removed without authorization. To such ends, the disclosed receptacle may include one or more radio frequency (RF) wireless communication devices configured to transmit RF signal(s) including data pertaining to various conditions to be monitored. Information from the RF signal(s) may be delivered through the internet to a server, which may be cloud-based in some instances, allowing for inter-networking of the system components and other elements as part of the internet of things (IOT). Mobile and other computing devices may access the information stored at the server to monitor the receptacle, as well as control overall system operation.

In accordance with some embodiments, the disclosed delivery receptacle may be configured as a smart, secure, wirelessly monitored delivery drop box or locker for parcels or other packages. As discussed herein, the disclosed receptacle may be configured, in accordance with some embodiments, to detect tampering or unauthorized access thereto and issue an alarm locally and/or notify the owner of the delivery receptacle or other designated party, combating theft and package tampering, among other difficulties commonly faced in package delivery contexts. Moreover, the disclosed delivery receptacle may be utilized in tracking/confirming delivery of a given package at its intended destination. For instance, in accordance with some embodiments, the disclosed techniques may be utilized in providing a proof of delivery record including data such as, but not limited to, delivery agent ID, package ID, identifier of the computing device that unlocked the delivery receptacle, timestamp of unlock, and/or a unique ID code for the delivery receptacle itself.

In accordance with some embodiments, the disclosed delivery receptacle, as well as the related systems and techniques, may be employed, for example, at residences and commercial buildings for package deliveries. In some cases, the disclosed delivery receptacle further may be configured to receive and refrigerate delivered items, such as food, medical, or pharmaceutical provisions. Numerous suitable uses and applications will be apparent in light of this disclosure.

As will be appreciated in light of this disclosure, the disclosed delivery receptacle and related systems are quick and easy to use, placing no extra burden on delivery agents or users. More generally, the disclosed delivery receptacle may provide for these and others benefits while also providing for secure storage of packages and proof of delivery.

Delivery Receptacle Structure and Operation

Figure 2:
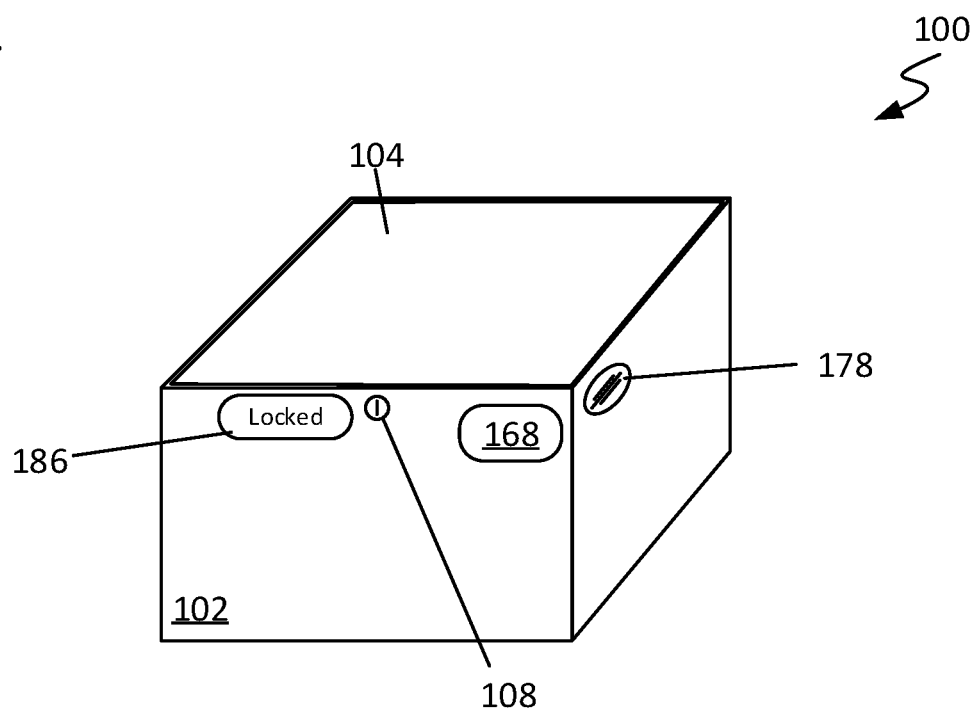

FIGS. 1-2 illustrate several views of a delivery receptacle 100 configured in accordance with an embodiment of the present disclosure. As described herein, receptacle 100 may be configured, in accordance with some embodiments, to provide a secure package delivery drop box which may be remotely monitored for delivery and the integrity of any packages 10 delivered thereto. Receptacle 100 may be configured to be installed (or otherwise situated) at a given host site, such as a porch, mail kiosk, or storefront, to name a few. Other suitable installation sites and contexts will be apparent in light of this disclosure. In accordance with some embodiments, receptacle 100 may be configured to be mounted to a floor, a wall, a railing, a post, or any other desired surface so that receptacle 100 cannot be removed easily. Receptacle 100 may be configured, in accordance with some embodiments, for preventing and/or monitoring unauthorized activities with the receptacle 100 or any package 10 delivered thereto, such as unauthorized access, use, theft, vandalism, or harm thereto.

As can be seen, receptacle 100 may include a body portion 102 and a cover portion 104 which engages body portion 102 in a hinged, sliding, friction fit, snap fit, or other desired manner. Body portion 102 generally may be configured as a box, a cylinder, or other desired container shape having a hollow interior region 115. Cover portion 104 generally may be configured to be moved/removed with respect to body portion 102 to open and close receptacle 100, allowing access to hollow interior region 115 (e.g., for delivery of a package 10 therein).

As will be appreciated in light of this disclosure, it may be desirable, at least in some instances, to construct body portion 102 and cover portion 104 to be durable and reusable, as well as substantially impervious to water, dust, and other environmental hazards. To such ends, body portion 102 and cover portion 104 may be constructed from any of a wide range of suitable materials, including plastic(s), rubber(s), composite material(s), and/or metal(s) (including alloys), among others. In some cases, body portion 102 and cover portion 104 may be constructed, for example, from a high-impact plastic or composite material.

The dimensions and geometry of body portion 102 and cover portion 104 may be customized, as desired for a given target application or end-use. Generally, body portion 102 and cover portion 104 may be configured to accommodate standard and/or other package 10 sizes, as typically may be encountered in the parcel delivery industry. In some instances, body portion 102 and cover portion 104 may be customizable to fit the space available at a given installation site. In accordance with some embodiments, receptacle 100 may be configured for adjustment (e.g., in size and/or geometry) to accommodate packages 10 that are large or otherwise unwieldy. To that end, either (or both) body portion 102 and cover portion 104 may be configured, in some embodiments, to expand and contract (e.g., like an accordion) to a given target size. Alternatively (or additionally), cover portion 104 may be flexible and configured, in some embodiments, to be pulled out (e.g., like a window shade) to a given target size, optionally including fold-out end covers.

In accordance with some embodiments, body portion 102 and cover portion 104 may be configured to provide a weatherproof enclosure for package(s) 10 within receptacle 100. In some embodiments, body portion 102 and/or cover portion 104 may be thermally insulated, thereby providing a receptacle 100 suitable for storage of cold or spoilable goods. In some such instances, receptacle 100 optionally may include a source of refrigeration, such as a refrigeration coil.

Receptacle 100 further may include a lock 106 configured to lock cover portion 104 in engagement with body portion 102 to secure any package(s) 10 within hollow interior region 115 of body portion 102. Locking/unlocking of lock 106 may be controlled electronically (e.g., through an electronic locking mechanism) and/or through use of a physical key-based locking means. In some embodiments, receptacle 100 may have a physical key opening 108 to allow for locking/unlocking of receptacle 100 via a physical key. As will be appreciated, inclusion of such physical key opening 108 may serve as a backup means for unlocking receptacle 100 should electronic control of lock 106 fail. Also, in at least some embodiments, receptacle 100 may include an internal unlocking/release means configured to allow for unlocking of lock 106 for opening of receptacle 100 from the inside. As will be appreciated, this may provide an extra safety measure to ensure that any person who might become trapped inside receptacle 100 can escape easily.

In some embodiments, receptacle 100 may include a lock driver 110 configured to engage/disengage lock 106. Lock driver 110 may be a motor or other suitable drive mechanism, as will be appreciated in light of this disclosure, which may be controlled by processor 156 (discussed below). In an example case, the polarity of the voltage supplied to lock driver 110 may be controlled by processor 156 to effectuate locking and unlocking; that is, supply of a positive voltage may result in one of either locking or unlocking, and supply of a negative voltage may result in the other of either locking or unlocking.

Figure 3:
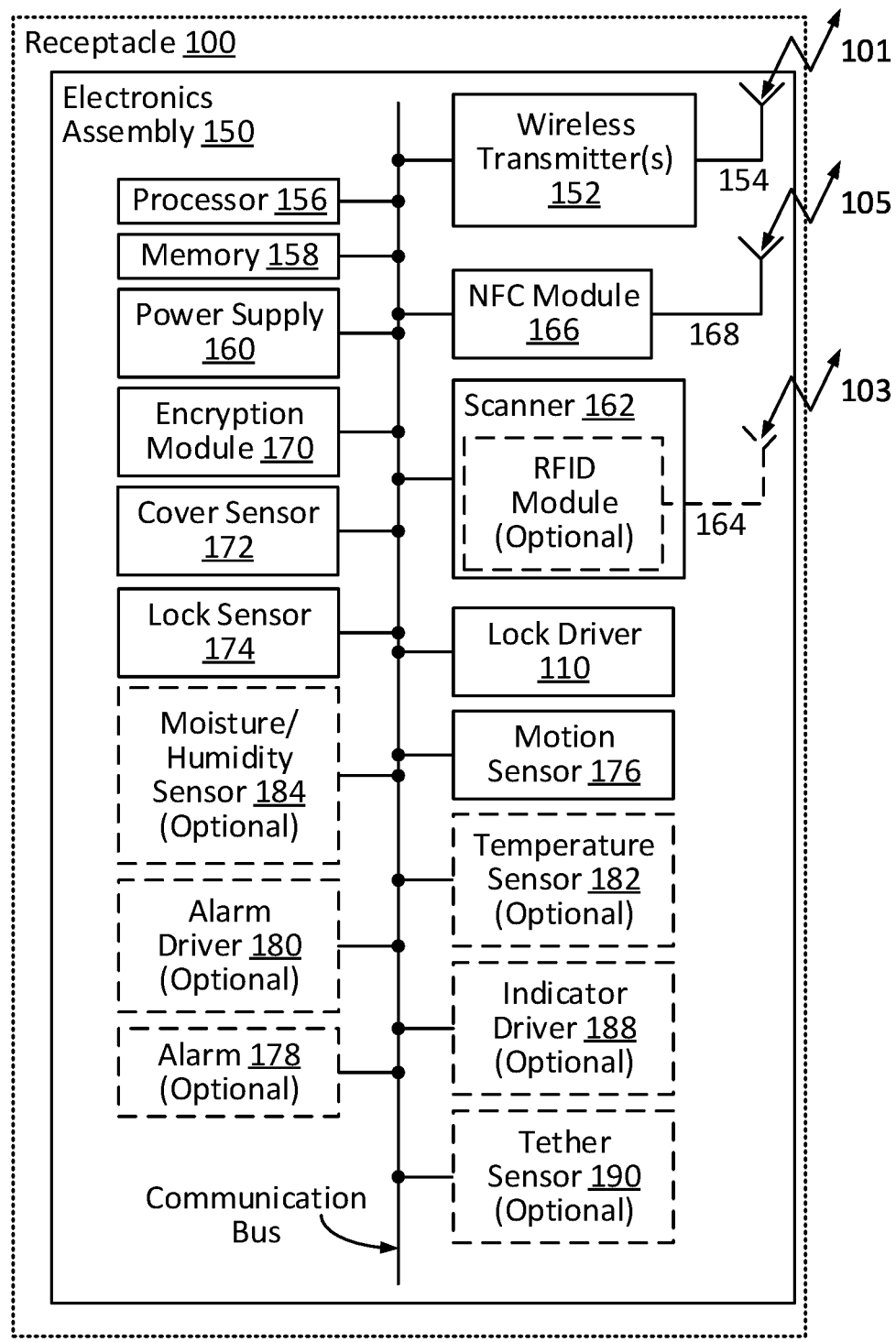
FIG. 3 is a block diagram of an electronics assembly of a delivery receptacle, in accordance with an embodiment of the present disclosure.

Receptacle 100 further may include a number of electronic components for providing a variety of wireless monitoring capabilities and controlling any (or all) of the various operations and functions of receptacle 100, as described herein. For instance, consider FIG. 3, which is a block diagram of an electronics assembly 150 of delivery receptacle 100, in accordance with an embodiment of the present disclosure. In general, the specific constituent elements of electronics assembly 150 may be customized, as desired for a given target application or end-use. In accordance with some embodiments, any (or all) of the various electronic components of electronics assembly 150 may communicate with one another via a communication bus or other suitable interconnect. Also, as will be appreciated in light of this disclosure, any (or all) of the various electronic components of electronics assembly 150 may be populated on one or more printed circuit boards (PCBs) or other suitable intermediate(s) or substrate(s), at least in some instances. In some cases, electronics assembly 150 may be housed, at least in part, within body portion 102 and/or cover portion 104, though in some other cases, electronics assembly 150 may be situated, in part or in whole, external to body portion 102 and/or cover portion 104 (e.g., in an external housing).

Electronics assembly 150 may include one or more wireless transmitters 152 configured to communicate via one or more radio frequency (RF) communication protocols, including any one or combination of Bluetooth, Wi-Fi, and cellular communication protocols. As described herein, a given wireless transmitter 152 may be either: (1) a dedicated transmitter device provided with only transmitting capabilities; or (2) a transceiver device provided with both transmitting and receiving capabilities. A given wireless transmitter 152 may be configured, in accordance with some embodiments, to transmit and/or receive a radio frequency (RF) signal 101 (discussed below).

In some embodiments, electronics assembly 150 may include a wireless transmitter 152 configured to communicate via a Bluetooth communication protocol, such as Bluetooth Low Energy (BLE) protocol. To that end, wireless transmitter 152 may be, in an example embodiment, an active short-wavelength ultra-high frequency (UHF) radio wave Bluetooth-compatible device configured to transmit and/or receive Bluetooth signals.

In some embodiments, electronics assembly 150 may include a wireless transmitter 152 configured to communicate via a Wi-Fi communication protocol. To that end, wireless transmitter 152 may be, in an example embodiment, a Wi-Fi-compatible device configured to transmit and/or receive Wi-Fi signals.

In some embodiments, electronics assembly 150 may include a wireless transmitter 152 configured to communicate via a cellular communication protocol. To that end, wireless transmitter 152 may be, in an example embodiment, an active cellular modem or other cellular-compatible device configured to transmit and/or receive cellular signals. In some instances, a cellular-capable wireless transmitter 152 may be configured to communicate over a LTE-CatM1 network (e.g., to server 1014, discussed below). In support of such cellular capabilities, electronics assembly 150 further may include a subscriber identification module (SIM) card socket or comparable device, in some embodiments.

In accordance with some embodiments, electronics assembly 150 may include multiple wireless transmitters, the desired combination of which may be customized as desired for a given target application or end-use. For instance, in one example embodiment, electronics assembly 150 may include: (1) a first Bluetooth wireless transmitter 152; and (2) a second Wi-Fi wireless transmitter 152. In another example embodiment, electronics assembly 150 may include: (1) a first Bluetooth wireless transmitter 152; and (2) a second cellular wireless transmitter 152. In another example embodiment, electronics assembly 150 may include: (1) a first Bluetooth wireless transmitter 152; and (2) a second Wi-Fi and cellular wireless transmitter 152 configured to communicate via either protocol, as selected for a given context. In still another example embodiment, electronics assembly 150 may include a single wireless transmitter 152 configured to communicate via any one (or combination) of Bluetooth, Wi-Fi, and cellular. As will be appreciated, one or more RF antennas 154 (discussed below) accordingly may be provided for any of these example configurations.

As will be appreciated in light of this disclosure, it may be desirable, at least in some instances, to ensure that a given wireless transmitter 152 is configured to minimize or otherwise reduce its power consumption in effort to conserve power supply 160 (discussed below). To that end, a given wireless transmitter 152 may be, at least in some embodiments, a low-power transmitter/transceiver element having a nominal operating voltage. In accordance with some embodiments, a given wireless transmitter 152 may be configured to remain in a low-power state (e.g., a sleep state, hibernation state, or off state) until it is woken up, which may occur periodically or upon receipt of a given interrupt or wake-up signal from some other constituent element of electronics assembly 150 (e.g., such as processor 156, discussed below).

Electronics assembly 150 further may include one or more RF antennas 154 (for the one or more wireless transmitters 152), and a given RF antenna 154 may be configured to transmit and/or receive one or more RF signals, such as RF signal 101 (discussed below). To such ends, a given RF antenna 154 may be, for example, a printed circuit board (PCB) antenna configured as typically done or any other suitable antenna, as will be apparent in light of this disclosure. A given RF antenna 154 may be situated on a given surface within the interior of receptacle 100 (e.g., within hollow interior region 115 of and/or on cover portion 104). In some cases in which a cellular-capable wireless transmitter 152 is provided, a corresponding cellular antenna 154 optionally may be included. In an example case, such cellular antenna 154 may be provided directly on a main board of electronics assembly 150.

Electronics assembly 150 also may include a processor 156 configured, in accordance with some embodiments, to perform or otherwise facilitate a given operation or function associated with electronics assembly 150 (or receptacle 100 more generally). To that end, processor 156 may be, for example, a central processing unit (CPU), a microcontroller unit (MCU), or any other suitable processing element, as will be apparent in light of this disclosure. Moreover, processor 156 may be configured to communicate with any one (or combination) of the other various electronic components of electronics assembly 150 via a communication bus, a serial interface, one or more control signals, or other suitable interconnection means. Additionally, processor 156 may be configured to access data stored at memory 158 (discussed below) or otherwise accessible to receptacle 100 (e.g., from server 1014, discussed below). In some embodiments, processor 156 may be networked so as to provide a secure networking platform that prevents (or otherwise reduces the likelihood of) it being hacked.

As will be appreciated in light of this disclosure, it may be desirable, at least in some instances, to ensure that processor 156 is configured to minimize or otherwise reduce its power consumption in effort to conserve power supply 160 (discussed below). To that end, processor 156 may be, at least in some embodiments, a low-power processing element having a nominal operating voltage (e.g., about 3.3 V). In accordance with some embodiments, processor 156 may be configured to remain in a low-power state (e.g., a sleep state, hibernation state, or off state) until it is woken up, which may occur periodically or upon receipt of a given interrupt or wake-up signal from some other constituent element of electronics assembly 150 (e.g., such as motion sensor 176, discussed below).

Electronics assembly 150 may include memory 158, which may be configured for use as program and/or data memory, in accordance with some embodiments. Memory 158 may be implemented with any one, or combination, of volatile and non-volatile memory and may be of any type and size, as desired for a given target application or end-use. In some cases, memory 158 may be configured for use in storing data, on a temporary or permanent basis, whether that data is native to receptacle 100 or received from another source (e.g., such as server 1014, discussed below). At least in some instances, memory 158 may be configured for use as processor workspace for processor 156.

In accordance with some embodiments, memory 158 may be (or otherwise include) a computer-readable medium that, when executed by a processor (e.g., such as processor 156), carries out (in part or in whole) any one or more of the operations and functions described herein. The computer-readable medium may be, for example, a hard drive, a compact disk, a memory stick, a server, or any other suitable non-transitory computer or computing device memory that includes executable instructions, or a plurality or combination of such memories. Other embodiments can be implemented, for instance, with gate-level logic or an application-specific integrated circuit (ASIC) or chip set, or other such purpose-built logic. Some embodiments can be implemented with a microcontroller having input/output (I/O) capability (e.g., inputs for receiving user inputs; outputs for directing other components) and one or more embedded routines for carrying out device functionality. In a more general sense, memory 158 may be implemented in hardware, software, firmware, or a combination thereof, as desired for a given target application or end-use.

Electronics assembly 150 additionally may include (or otherwise be configured to connect with) a power supply 160 configured to supply a given target amount of power to any of the various components of electronics assembly 150 (or receptacle 100, more generally). In some embodiments, power supply 160 may be an alternating current (AC) power supply. In some embodiments, power supply 160 may be a direct current (DC) power supply. For instance, power supply 160 may be a battery, which may be permanent or replaceable and of a given cell size or capacity (e.g., AA through D cell-sized batteries) and type (e.g., alkaline, lithium ion, etc.). In an example case, power supply 160 may be a battery configured to power electronics assembly 150 for one year or more without need of replacement. In some cases, power supply 160 may include or be operatively coupled with a photovoltaic module (e.g., a solar cell) configured to convert light energy to electrical energy for use by electronics assembly 150 (and/or electronics assemble 350, discussed below). In some such instances, the photovoltaic module may be configured to charge any batteries utilized as power supply 160 (and/or power supply 360, discussed below).

As will be appreciated in light of this disclosure, it may be desirable, at least in some instances, to include one or more voltage regulators connected between a given power supply 160 and a given other element of electronics assembly 150. A given voltage regulator may be configured, in accordance with some embodiments, to regulate the power in providing the operating voltage for processor 156 (and/or other constituent elements of electronics assembly 150).

Electronics assembly 150 also may include a scanner 162 configured to scan a label 12 of a given package 10 placed within receptacle 100. In some embodiments, scanner 162 may be configured as a barcode scanner for scanning barcode-based labels 12. Additionally (or alternatively), scanner 162 may be configured, in some embodiments, as a radio frequency identification (RFID) scanner for scanning passive RFID-based labels 12. To that end, scanner 162 may be, for example, a UHF RFID scanner configured to transmit and/or receive one or more RFID signals 103. As will be appreciated, in at least some cases in which an RFID-capable scanner 162 is provided, any difficulties stemming from the orientation of package 10 and line-of-sight visibility of label 12 within receptacle 100 may be obviated (or otherwise reduced). In scanning a given label 12, scanner 162 may obtain information (e.g., a package ID code) about package 10 which then may be wirelessly transmitted by a given wireless transmitter 152 in an RF signal 101 (e.g., to server 1014 via internet 1004, discussed below).

Additionally, in cases of an RFID-capable scanner 162, electronics assembly 150 further may include one or more RFID antennas 164. As will be appreciated in light of this disclosure, it may be desirable, at least in some instances, to have two or more RFID antennas 164 to improve the signal level from RFID-based scanner 162. As will be further appreciated, it may be desirable to orient the two or more RFID antennas 164 differently (e.g., with a 90° orientation offset). In an example case, two RFID antennas 164 may be disposed on different interior surfaces of receptacle 100 (e.g., within hollow interior region 115 of body portion 102 and/or on cover portion 104), allowing for reading of a passive RFID-based label 12 from multiple angles.

As will be appreciated in light of this disclosure, it may be desirable, at least in some instances, to ensure that scanner 162 is configured to minimize or otherwise reduce its power consumption in effort to conserve power supply 160. To that end, scanner 162 may be, at least in some embodiments, a low-power scanning element having a nominal operating voltage. In accordance with some embodiments, scanner 162 may be configured to remain in a low-power state (e.g., a sleep state, hibernation state, or off state) until it is woken up, which may occur periodically or upon receipt of a given interrupt or wake-up signal from some other constituent element of electronics assembly 150 (e.g., such as processor 156 based on in input received from cover sensor 172 and/or motion sensor 176, discussed below).

Electronics assembly 150 further may include a near-field communication (NFC) module 166 configured to transmit and/or receive one or more NFC signals 105. In accordance with some embodiments, a delivery agent or other party authorized to access receptacle 100 may place a computing device 1010 (discussed below) within range of NFC module 166, initiating communication between NFC module 166 and that computing device 1010 to effectuate locking/unlocking of lock 106 via a lock/unlock code in the NFC signal 105. To facilitate such communication, electronics assembly 150 further may include an NFC antenna 168, which may be situated on a given exterior surface of receptacle 100 (e.g., on body portion 102 and/or cover portion 104). In an example case, NFC antenna 168 may be configured as a loop antenna.

Electronics assembly 150 additionally may include an encryption module 170 configured to provide a means of securely storing a hardware root of trust for authentication certificate(s). Encryption module 170 may be configured, in accordance with some embodiments, to prevent (or otherwise protect against) electronically stealing authentication certificates in effort to gain access to receptacle 100.

In accordance with some embodiments, electronics assembly 150 may include a cover sensor 172 configured to detect whether cover portion 104 is engaged or disengaged with respect to body portion 102, indicating whether receptacle 100 is currently open or closed. In accordance with some embodiments, electronics assembly 150 may include a lock sensor 174 configured to detect whether lock 106 is engaged or disengaged, indicating whether receptacle 100 is currently locked or unlocked. To such ends, cover sensor 172 and/or lock sensor 174 may be, for example, a sensor switch or any other suitable sensing means, as will be apparent in light of this disclosure.

Electronics assembly 150 further may include a motion sensor 176 configured to detect movement in and/or around receptacle 100. To such ends, motion sensor 176 may be (or otherwise may include) a micro-electromechanical system (MEMS) accelerometer device, an infrared (IR) sensor, or any other suitable movement detection device, as will be apparent in light of this disclosure. In accordance with some embodiments, motion sensor 176 may be configured to output a wake-up signal to processor 156 in response to its activation as caused by the detected movement. In response to receipt of this wake-up signal, processor 156 may transition out of a low-power state (e.g., a sleep state, hibernation state, or off state) and send another wake-up signal to a given wireless transmitter 152 and instruct it to transmit RF signal 101 (discussed below). In this manner, processor 156 may remain in a low-power state until motion sensor 176 is activated, in accordance with some embodiments.

In accordance with some embodiments, electronics assembly 150 optionally further may include an alarm 178 configured to emit an audible and/or visible alarm. In some embodiments, alarm 178 may include, for example, a piezo alarm element capable of generating a loud audible alarm (e.g., having a volume of 110 dB or greater). In some embodiments, alarm 178 may include, for example, a light-emitting diode (LED) element capable of generating illumination of a given color (or range of colors). In at least some cases, alarm 178 physically may be situated on the exterior of receptacle 100 (e.g., on an exterior surface of body portion 102 and/or cover portion 104), though other positioning relative to receptacle 100 may be provided, as desired.

In some instances, electronics assembly 150 optionally further may include an alarm driver 180 operatively connected with alarm 178. Alarm driver 180 may be configured, in accordance with some embodiments, to boost the operating voltage of processor 156 up to a target level to drive alarm 178. For instance, in an example case, alarm driver 180 may boost the operating voltage of processor 156 from 3.3 V up to 20 V to drive a 110-dB piezo alarm 178.

Alarm 178 may be triggered by processor 156 on any of a wide range of conditions. For instance, alarm 178 may be triggered if cover sensor 172 detects tampering with or unauthorized opening of cover portion 104, in accordance with some embodiments. Alarm 178 may be triggered if lock sensor 174 detects tampering with or unauthorized unlocking of lock 106, in accordance with some embodiments. Alarm 178 may be triggered if tether sensor 190 detects breakage of tether 202 or unauthorized disengagement of tether 202 from attachment point 204 (each discussed below), in accordance with some embodiments. Alarm 178 may be triggered if rotary encoder 218 detects retraction or pulling out of an additional length of tether 202 (each discussed below), in accordance with some embodiments. Alarm 178 may be triggered if pressure sensor 362 detects a change in weight on pressure pad 300 (each discussed below), in accordance with some embodiments. Alarm 178 may be triggered if motion sensor 364 detects movement on and/or around pressure pad 300 (each discussed below), in accordance with some embodiments. The duration and type of alarm 178 may be customized, as desired for a given target application or end-use, and in some instances, may be configurable in software to meet user requirements.

In some embodiments, electronics assembly 150 optionally further may include a temperature sensor 182 configured to detect either or both: (1) the ambient temperature surrounding receptacle 100; and (2) the temperature within hollow interior region 115 of receptacle 100. To such ends, temperature sensor 182 may be any suitable temperature sensing device configured as typically done. In some embodiments, electronics assembly 150 optionally further may include a moisture/humidity sensor 184 configured to detect either or both: (1) the ambient moisture level surrounding receptacle 100; and (2) the moisture level within hollow interior region 115 of receptacle 100. To such ends, moisture/humidity sensor 184 may be any suitable moisture sensing device configured as typically done.

In some embodiments, electronics assembly 150 optionally may include an indicator 186 configured to provide a visual, audible, or other indication of the locked/unlocked condition or other status of receptacle 100. Indicator 186 may be mechanical and/or electronic in nature. In some cases, indicator 186 may be (or otherwise include) one or more light-emitting diodes (LEDs), a liquid-crystal display (LCD), or an e-ink display, to name a few options. In some cases, indicator 186 may be configured to slide or rotate to change from locked/unlocked designation when lock 106 correspondingly changes. To that end, in some embodiments, indicator 186 may be operatively connected with lock 106 via a motor or other suitable mechanical means configured to effectuate mechanical changing of indicator 186 in indicating the locked/unlocked status of lock 106. Additionally (or alternatively), electronics assembly 150 optionally further may include an indicator driver 188 operatively connected with indicator 186 and configured to drive indicator 186 to indicate the locked/unlocked status of lock 106.

As noted above, processor 156 may be involved with performing (or instructing another element to perform) a given operation or function associated with electronics assembly 150 (or receptacle 100 more generally). For instance, processor 156 may be configured to output a signal (e.g., a control signal) to lock 106 (and/or intervening lock driver 110) to effectuate engaging/disengaging of lock 106, in accordance with some embodiments. Processor 156 may be configured to output a signal (e.g., a wake-up signal and/or a control signal) to a given wireless transmitter 152 to effectuate transmission of RF signal 101, in accordance with some embodiments. Processor 156 may be configured to output a signal (e.g., a control signal) to alarm 178 to effectuate emission of an alarm by alarm 178, in accordance with some embodiments. Processor 156 may be configured to output a signal to power supply 160 to check the power level of power supply 160, in accordance with some embodiments.

In accordance with some embodiments, processor 156 may instruct alarm 178 to emit an alarm and/or may instruct a given wireless transmitter 152 to transmit an RF signal 101 including data pertaining to relevant condition(s) if any of the following occurs: (1) if cover portion 104 is detected by cover sensor 172 as being disengaged from body portion 102 while lock 106 is locked; (2) if lock 106 is detected by lock sensor 174 as being compromised; (3) if tether sensor 190 detects breakage of tether 202 or unauthorized disengagement of tether 202 from attachment point 204 (each discussed below) while lock 106 is locked; (4) if rotary encoder 218 detects retraction or pulling out of an additional length of tether 202 (each discussed below) while lock 106 is locked; (5) if pressure sensor 362 detects a change in weight on pressure pad 300 (each discussed below) while lock 106 is locked; (6) if motion sensor 364 movement on and/or around pressure pad 300 (each discussed below) while lock 106 is locked; and/or (7) if the remaining power level of power supply 160 is depleted or otherwise below a given threshold.

As will be appreciated in light of this disclosure, a given sub-group or combination of elements of electronics assembly 150 may be integrated or otherwise combined with one another as a single element (e.g., a single circuit or chip) configured to serve their multiple respective functions, in accordance with some embodiments. For instance, in some cases, processor 156 and memory 158 may be integrated together. In some cases, multiple wireless transmitters 152 may be integrated together. Other suitable combinations and integrations of the constituent components of electronics assembly 150 will be apparent in light of this disclosure.

Tether System Structure and Operation

Figure 4:
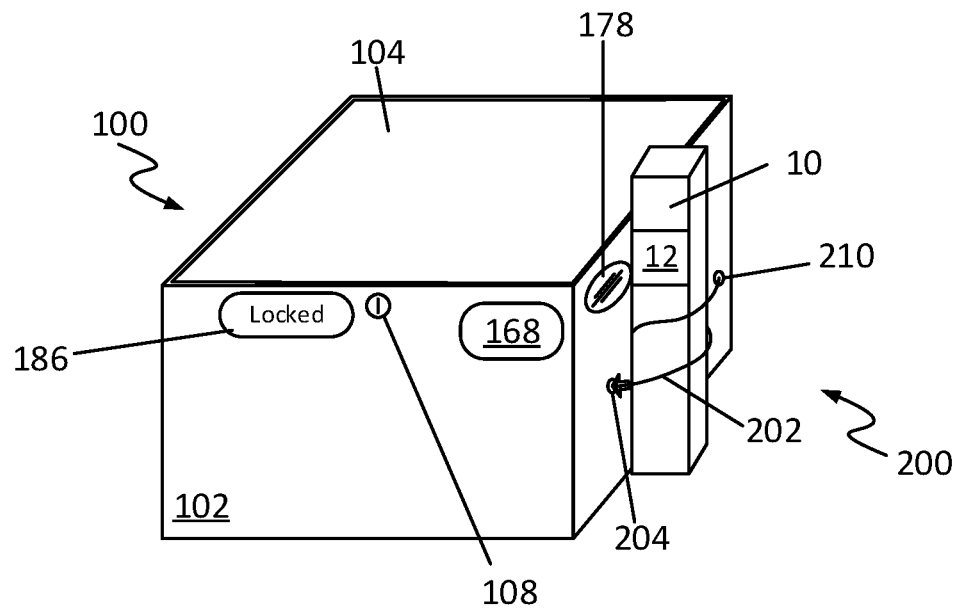
FIGS. 4-5 illustrate several views of a delivery receptacle optionally including a tether system configured in accordance with an embodiment of the present disclosure.
Figure 5:
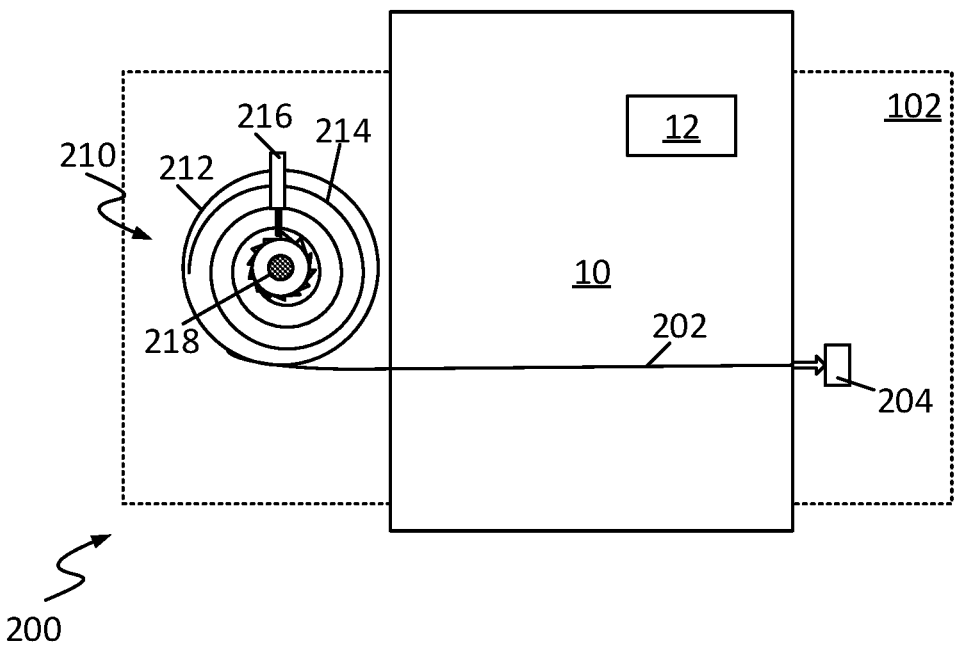

In accordance with some embodiments, receptacle 100 optionally may include (or be provided with) one or more means for monitoring packages 10 delivered external of receptacle 100 (e.g., because such packages 10 do not physically fit within receptacle 100). For instance, consider FIGS. 4-5, which illustrate several views of a delivery receptacle 100 optionally including a tether system 200 configured in accordance with an embodiment of the present disclosure. Tether system 200 may be native to receptacle 100 or provided as a separate attachment which may be operatively interfaced with receptacle 100.

Tether system 200 may include a tether 202 configured to be wrapped around, fed through, or otherwise interfaced with a package 10 outside of receptacle 100. In some embodiments, tether 202 may be or include a line, cable, rope, chain, or other lead. In some embodiments, tether 202 may be or include a net, mesh, snare, or other enveloping or encapsulating means. In an example case, tether 202 may be a line that is implanted with a netting material configured to expand out over a given package 10 when deployed.

In some embodiments, tether 202 may include one or more electrically conductive traces running along its length. The electrically conductive trace(s) may be embedded in or otherwise integrated with tether 202, for example. The quantity and material composition of the electrically conductive trace(s) may be customized, as desired for a given target application or end-use. For instance, a given electrically conductive trace may be any one, or combination, of electrically conductive metals, alloys, polymers, or composites (e.g., ceramics, plastics, and so forth, optionally doped with electrically conductive material).

In accordance with some embodiments, tether 202 may be configured to engage with an attachment point 204. To that end, receptacle 100 may include an attachment point 204 with which tether 202 may be affixed in a temporary or permanent manner. Attachment point 204 may be provided on the exterior of receptacle 100 (e.g., on body portion 102 and/or on cover portion 104), in accordance with some embodiments.

In accordance with some embodiments, electronics assembly 150 further may include a tether sensor 190 configured to detect engagement/disengagement of tether 202 with attachment point 204. Tether sensor 190 may be disposed, for example, at or near attachment point 204. As noted above, at least in some embodiments, tether 202 may include electrically conductive trace(s). Thus, in accordance with some embodiments, in engaging tether 202 with attachment point 204, tether sensor 190 may detect electrical coupling of tether 202 with electronics assembly 150. In this manner, if the circuit between tether 202 and electronics assembly 150 is broken (e.g., such as by cutting or otherwise sufficiently damaging tether 202 or disengaging tether 202 from attachment point 204), tether sensor 190 may detect the breakage and communicate such to processor 156.

Tether system 200 further may include a stowage means 210 configured to facilitate stowage of tether 202. Stowage means 210 may include, for example, a spool 212 on which tether 202 may be wound, a retraction mechanism 214 (e.g., a return spring) for coiling tether 202 around spool 212 and keeping tether 202 taught when pulled out for use and engaged with attachment point 204. Stowage means 210 further may include, for example, a stopping mechanism 216 configured to prevent retraction or advancement of tether 202 from spool 212 under certain circumstances. For example, in accordance with some embodiments, when lock 106 is locked, tether 202 may be prevented from being advanced further from stowage means 210 by stopping mechanism 216.

In accordance with some embodiments, stowage means 210 may include a rotary encoder 218 (or other suitable sensor) configured to detect when tether 202 is pulled out from or allowed to retract on spool 212. Thus, in accordance with some embodiments, if there is an attempt to pull out a greater length of tether 202 or if tether 202 is allowed to retract while lock 106 is locked (e.g., such as may occur if package 10 is removed from tether 202), then rotary encoder 218 may detect the change in the utilized length of tether 202 and communicate such to processor 156.

Pressure Pad Structure and Operation

Figure 6:
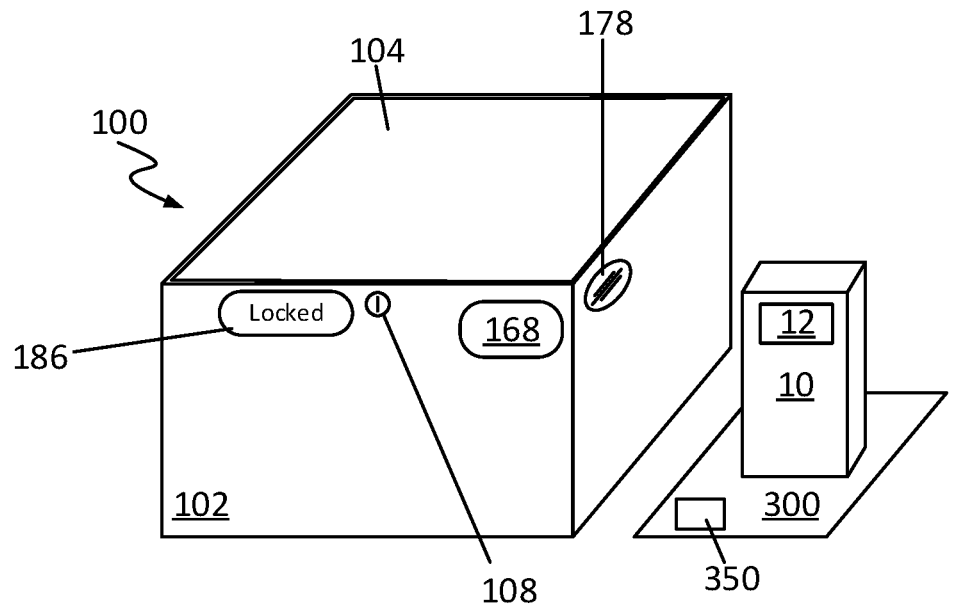
FIG. 6 illustrates a delivery receptacle optionally including a pressure pad system configured in accordance with an embodiment of the present disclosure.

As noted above, receptacle 100 optionally may include (or be provided with) one or more means for monitoring packages 10 delivered external of receptacle 100 (e.g., because such packages 10 do not physically fit within receptacle 100). For instance, consider FIG. 6, which illustrates a delivery receptacle 100 optionally including a pressure pad 300 configured in accordance with an embodiment of the present disclosure. Pressure pad 300 may be attached to (otherwise hosted) by receptacle 100 or provided as a separate attachment which may be operatively engaged with receptacle 100. One or a plurality of pressure pads 300 may be communicatively coupled with a given receptacle 100.

As can be seen, pressure pad 300 may be configured to have a package 10 placed thereon. Pressure pad 300 generally may be configured as a flat structure of a given shape (e.g., rectangular, circular, etc.) and dimensions. Pressure pad 300 may be constructed from any of a wide range of suitable materials, including plastic(s), rubber(s), composite material(s), and/or metal(s) (including alloys). As will be appreciated in light of this disclosure, it may be desirable to construct pressure pad 300 to be durable and reusable. To that end, pressure pad 300 may be constructed such that it is substantially impervious to water, dust, and other environmental hazards. Additionally, at least in some embodiments, pressure pad 300 may be constructed from a high-impact plastic or rubber material.

Figure 7:
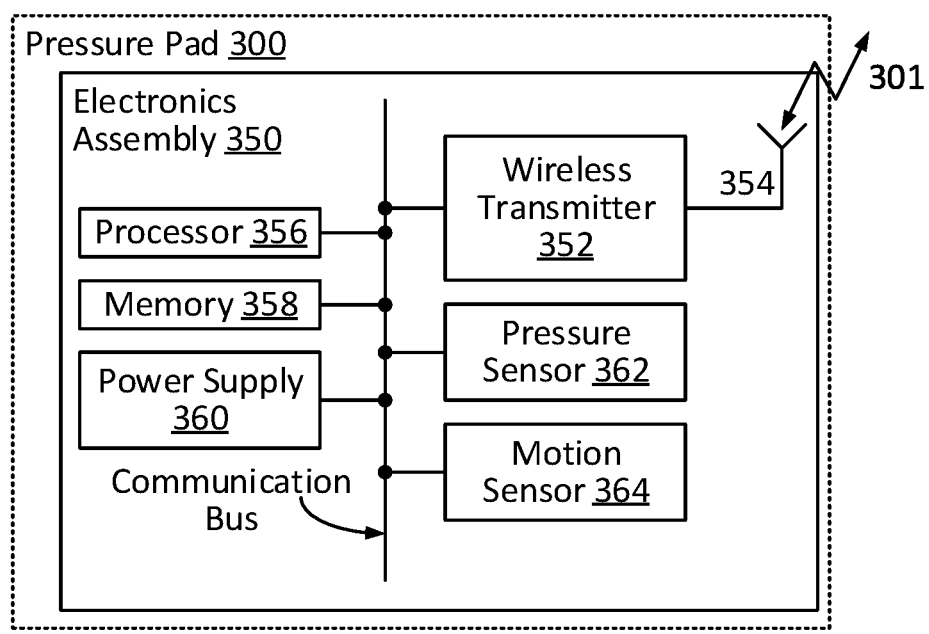
FIG. 7 is a block diagram of an electronics assembly of a pressure pad, in accordance with an embodiment of the present disclosure.

Pressure pad 300 further may include a number of electronic components for providing a variety of wireless monitoring capabilities and controlling any (or all) of the various operations and functions of pressure pad 300, as described herein. For instance, consider FIG. 7, which is a block diagram of an electronics assembly 350 of pressure pad 300, in accordance with an embodiment of the present disclosure. In general, the specific constituent elements of electronics assembly 350 may be customized, as desired for a given target application or end-use. In accordance with some embodiments, any (or all) of the various electronic components of electronics assembly 350 may communicate with one another via a communication bus or other suitable interconnect. Also, as will be appreciated in light of this disclosure, any (or all) of the various electronic components of electronics assembly 350 may be populated on one or more PCBs or other suitable intermediate(s) or substrate(s), at least in some instances. In some cases, electronics assembly 350 may be housed, at least in part, within pressure pad 300, though in some other cases, electronics assembly 350 may be situated, in part or in whole, external to pressure pad 300 (e.g., in an external housing).

Electronics assembly 350 may include a wireless transmitter 352 configured to communicate via one or more RF communication protocols, including Bluetooth communication protocols. As described herein, wireless transmitter 352 may be either: (1) a dedicated transmitter device provided with only transmitting capabilities; or (2) a transceiver device provided with both transmitting and receiving capabilities. Wireless transmitter 352 may be configured, in accordance with some embodiments, to transmit and/or receive an RF signal 301 (discussed below).

In some embodiments, electronics assembly 350 may include a wireless transmitter 352 configured to communicate via a Bluetooth communication protocol, such as a BLE protocol. To that end, wireless transmitter 352 may be, in an example embodiment, an active short-wavelength UHF radio wave Bluetooth-compatible device configured to transmit and/or receive Bluetooth signals.

As will be appreciated in light of this disclosure, it may be desirable, at least in some instances, to ensure that wireless transmitter 352 is configured to minimize or otherwise reduce its power consumption in effort to conserve power supply 360 (discussed below). To that end, wireless transmitter 352 may be, at least in some embodiments, a low-power transmitter/transceiver element having a nominal operating voltage. In accordance with some embodiments, wireless transmitter 352 may be configured to remain in a low-power state (e.g., a sleep state, hibernation state, or off state) until it is woken up, which may occur periodically or upon receipt of a given interrupt or wake-up signal from some other constituent element of electronics assembly 350 (e.g., such as processor 356, discussed below).

Electronics assembly 350 further may include an RF antenna 354 for wireless transmitter 352, and RF antenna 354 may be configured to transmit and/or receive one or more RF signals, such as RF signal 301 (discussed below). To such end, RF antenna 354 may be, for example, a PCB antenna configured as typically done or any other suitable antenna, as will be apparent in light of this disclosure. RF antenna 354 may be situated on or within pressure pad 300.

Electronics assembly 350 also may include a processor 356 configured, in accordance with some embodiments, to perform or otherwise facilitate a given operation or function associated with pressure pad 300 (or receptacle 100 more generally). To that end, processor 356 may be, for example, a CPU, an MCU, or any other suitable processing element, as will be apparent in light of this disclosure. Moreover, processor 356 may be configured to communicate with any one (or combination) of the other various electronic components of electronics assembly 350 via a communication bus, a serial interface, one or more control signals, or other suitable interconnection means. Additionally, processor 356 may be configured to access data stored at memory 358 (discussed below) or otherwise accessible to pressure pad 300.

As will be appreciated in light of this disclosure, it may be desirable, at least in some instances, to ensure that processor 356 is configured to minimize or otherwise reduce its power consumption in effort to conserve power supply 360 (discussed below). To that end, processor 356 may be, at least in some embodiments, a low-power processing element having a nominal operating voltage. In accordance with some embodiments, processor 356 may be configured to remain in a low-power state (e.g., a sleep state, hibernation state, or off state) until it is woken up, which may occur periodically or upon receipt of a given interrupt or wake-up signal from some other constituent element of electronics assembly 350 (e.g., such as motion sensor 364, discussed below).

Electronics assembly 350 may include memory 358, which may be configured for use as program and/or data memory, in accordance with some embodiments. Memory 358 may be implemented with any one, or combination, of volatile and non-volatile memory and may be of any type and size, as desired for a given target application or end-use. In some cases, memory 358 may be configured for use in storing data, on a temporary or permanent basis, whether that data is native to pressure pad 362 or received from another source (e.g., such as server 1014, discussed below). At least in some instances, memory 358 may be configured for use as processor workspace for processor 356.

In accordance with some embodiments, memory 358 may be (or otherwise include) a computer-readable medium that, when executed by a processor (e.g., such as processor 356), carries out (in part or in whole) any one or more of the operations and functions described herein. The computer-readable medium may be, for example, a hard drive, a compact disk, a memory stick, a server, or any other suitable non-transitory computer or computing device memory that includes executable instructions, or a plurality or combination of such memories. Other embodiments can be implemented, for instance, with gate-level logic or an ASIC or chip set, or other such purpose-built logic. Some embodiments can be implemented with a microcontroller having I/O capability (e.g., inputs for receiving user inputs; outputs for directing other components) and one or more embedded routines for carrying out device functionality. In a more general sense, memory 358 may be implemented in hardware, software, firmware, or a combination thereof, as desired for a given target application or end-use.

Electronics assembly 350 additionally may include (or otherwise be configured to connect with) a power supply 360 configured to supply a given target amount of power to any of the various components of electronics assembly 350 (or pressure pad 300, more generally). In some embodiments, power supply 360 may be an AC power supply. In some embodiments, power supply 360 may be a DC power supply. For instance, power supply 360 may be a battery, which may be permanent or replaceable and of a given cell size or capacity (e.g., AA through D cell-sized batteries) and type (e.g., alkaline, lithium ion, etc.). In an example case, power supply 360 may be a battery configured to power electronics assembly 350 for one year or more without need of replacement. In some cases, power supply 360 may include or be operatively coupled with a photovoltaic module (e.g., a solar cell) configured to convert light energy to electrical energy for use by electronics assembly 350 (and/or electronics assemble 150). In some such instances, the photovoltaic module may be configured to charge any batteries utilized as power supply 360 (and/or power supply 160).

In accordance with some embodiments, electronics assembly 350 may include a pressure sensor 362 configured to detect the weight of a package 10 placed on pressure pad 300, indicating the presence or absence of a package 10 thereon. To that end, pressure sensor 362 may be (or otherwise may include), for example, a load cell, a pressure-sensitive resistor circuit, or any other suitable pressure or force detection device, as will be apparent in light of this disclosure. As will be appreciated in light of this disclosure, it may be desirable, at least in some instances, to configure pressure sensor 362 such that pressure pad 300 may accommodate a wide range of package 10 weights while still being able to detect removal of even a single lightweight package 10 therefrom. In this manner, if a change in pressure on pressure pad 300 occurs (e.g., such as upon removal of package 10 from pressure pad 300) while lock 106 is locked, then pressure sensor 362 may detect the change and communicate such to processor 356. At least in some instances, pressure sensor 362 may connect with processor 356, for example, via an analog-to-digital converter of such processor 356.

Electronics assembly 350 further may include a motion sensor 364 configured to detect motion on and/or around pressure pad 300. To such ends, motion sensor 364 may be (or otherwise may include) a MEMS accelerometer device, an IR sensor, or any other suitable movement detection device, as will be apparent in light of this disclosure. In accordance with some embodiments, motion sensor 364 may be configured to detect movement of a package 10 from pressure pad 300. In this manner, if a package 10 is removed from pressure pad 300 while lock 106 is locked, then motion sensor 364 may detect the movement and communicate such to processor 356.

In accordance with some embodiments, motion sensor 364 may be configured to output a wake-up signal to processor 356 in response to its activation as caused by the detected movement. In response to receipt of this wake-up signal, processor 356 may transition out of a low-power state (e.g., a sleep state, hibernation state, or off state) and send another wake-up signal to wireless transmitter 352 and instruct it to transmit RF signal 301 (discussed below). In this manner, processor 356 may remain in a low-power state until motion sensor 364 is activated, in accordance with some embodiments.

As noted above, processor 356 may be involved with performing (or instructing another element to perform) a given operation or function associated with electronics assembly 350 (or pressure pad 300 more generally). For instance, processor 356 may be configured to output a signal (e.g., a wake-up signal and/or a control signal) to wireless transmitter 352 to effectuate transmission of RF signal 301, in accordance with some embodiments. Processor 356 may be configured to output a signal to power supply 360 to check the power level of power supply 360, in accordance with some embodiments.

As will be appreciated in light of this disclosure, a given sub-group or combination of elements of electronics assembly 350 may be integrated or otherwise combined with one another as a single element (e.g., a single circuit or chip) configured to serve their multiple respective functions, in accordance with some embodiments. For instance, in some cases, processor 356 and memory 358 may be integrated together. In some cases, wireless transmitter 352 and processor 356 may be integrated together. Other suitable combinations and integrations of the constituent components of electronics assembly 350 will be apparent in light of this disclosure.

RF Signals

As previously noted, wireless transmitter 352 (of pressure pad 300) may be configured, in accordance with some embodiments, to transmit and/or receive an RF signal 301, which may be a Bluetooth signal, for example. Transmission of RF signal 301 may be provided continuously, periodically (e.g., at fixed or variable intervals), on-demand, or otherwise as desired. Moreover, the repetition rate and transmission power at which RF signal 301 is transmitted may be varied, as desired for a given target application or end-use. In accordance with some embodiments, RF signal 301 may be received by a given wireless transmitter 152 of receptacle 100, which in turn may pull data from that RF signal 301 and forward (e.g., relay) it in its own RF signal 101 transmitted by a given wireless transmitter 152.

In accordance with some embodiments, transmission of RF signal 301 by wireless transmitter 352 may occur upon instruction from processor 356. For instance, processor 356 may instruct wireless transmitter 352 to transmit an RF signal 301 if pressure sensor 362 detects a change in pressure on pressure pad 300, in accordance with some embodiments. Processor 356 may instruct wireless transmitter 352 to transmit an RF signal 301 if movement sensor 364 detects movement of a package 10 on pressure pad 300, in accordance with some embodiments. Processor 356 may instruct wireless transmitter 352 to transmit an RF signal 301 if the remaining power level of power supply 360 is depleted or otherwise below a given threshold.

RF signal 301 may include any of a wide range of data pertaining to operation or status of pressure pad 300, in part or in whole, or other conditions to be monitored. For example, in some instances, RF signal 301 may include data pertaining to a detected change in weight (e.g., detected by pressure sensor 362) on pressure pad 300. In some instances, RF signal 301 may include data pertaining to a detected movement (e.g., detected by motion sensor 364) on pressure pad 300. In some instances, RF signal 301 may include data pertaining to the remaining power level of power source 360.

Returning to FIG. 3, as previously noted, a given wireless transmitter 152 may be configured, in accordance with some embodiments, to transmit and/or receive an RF signal 101, which may be a Bluetooth, Wi-Fi, or cellular signal, for example. Transmission of RF signal 101 may be provided continuously, periodically (e.g., at fixed or variable intervals), on-demand, or otherwise as desired. Moreover, the repetition rate and transmission power at which RF signal 101 is transmitted may be varied, as desired for a given target application or end-use.

In accordance with some embodiments, transmission of RF signal 101 by a given wireless transmitter 152 may occur upon instruction from processor 156. For instance, processor 156 may instruct wireless transmitter 152 to transmit an RF signal 101 if any of the following occurs: (1) if cover portion 104 is detected by cover sensor 172 as being disengaged from body portion 102 while lock 106 is locked; (2) if lock 106 is detected by lock sensor 174 as being compromised; (3) if tether sensor 190 detects breakage of tether 202 or unauthorized disengagement of tether 202 from attachment point 204 while lock 106 is locked; (4) if rotary encoder 218 detects retraction or pulling out of an additional length of tether 202 while lock 106 is locked; (5) if pressure sensor 362 detects a change in weight on pressure pad 300 while lock 106 is locked; (6) if motion sensor 364 movement on and/or around pressure pad 300 while lock 106 is locked; and/or (7) if the remaining power level of power supply 160 and/or power supply 360 is depleted or otherwise below a given threshold.

RF signal 101 may include any of a wide range of data pertaining to the operation or status of receptacle 100, tether system 200, or pressure pad 300, in part or in whole, or other conditions to be monitored. For example, in some instances, RF signal 101 may include data pertaining to the closed/open status of cover portion 104. In some instances, RF signal 101 may include data pertaining to the locked/ unlocked status of lock 106. In some instances, RF signal 101 may include data pertaining to connection/disconnection of tether 202 from attachment point 204 and/or breakage of tether 202. In some instances, RF signal 101 may include data pertaining to retraction or pulling out of an additional length of tether 202. In some instances, RF signal 101 may include data pertaining to the remaining power level of power source 160. In some instances, RF signal 101 may include data pertaining to proof of delivery of a given package 10 to receptacle 100 (or an associated tether system 200 or pressure pad 300). In some instances, RF signal 101 may include data pertaining to an alert of tampering or theft of a package 10 from receptacle 100 (or an associated tether system 200 or pressure pad 300).

In some instances, RF signal 101 may include data pulled from an RF signal 301 received from a pressure pad 300 communicatively coupled with receptacle 100. For example, in some cases, RF signal 101 may include data pertaining to a detected change in weight on pressure pad 300. In some cases, RF signal 101 may include data pertaining to a detected movement on pressure pad 300. In some cases, RF signal 101 may include data pertaining to the remaining power level of power source 360.

Overall System Architecture and Operation

Figure 8:
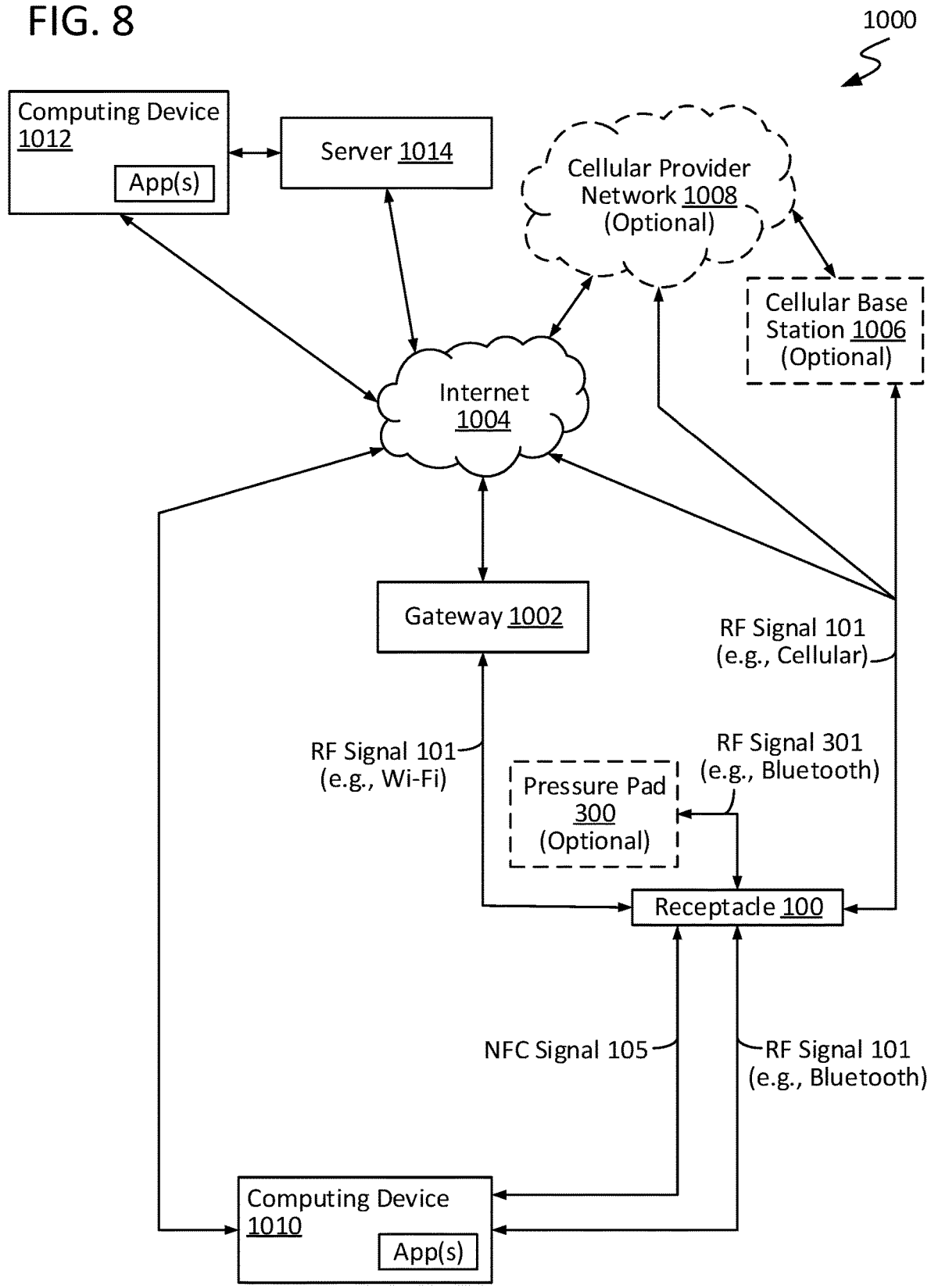
FIG. 8 illustrates a package delivery monitoring system configured in accordance with an embodiment of the present disclosure.

FIG. 8 illustrates a package delivery monitoring system 1000 configured in accordance with an embodiment of the present disclosure. As can be seen, system 1000 may include: (1) a delivery receptacle 100; (2) a gateway 1002; and (3) a server 1014. Moreover, in accordance with some embodiments, system 1000 may involve in its operation the internet 1004 and one or more computing devices 1010, 1012. In accordance with some embodiments, system 1000 may involve in its operation one or more cellular data elements, such as a cellular base station 1006 and a cellular provider network 1008. Each of these various elements is discussed in turn below. More generally, FIG. 8 illustrates communicative coupling of the various constituent elements of system 1000 and the overall flow of data within system 1000, in accordance with some embodiments.

RF Signal 101 may be received by any one (or combination) of a computing device 1010, a gateway 1002, a cellular base station 1006, and a cellular provider network 1008 within range, and information therefrom may be delivered through the internet 1004 to a server 1014. The information stored at server 1014 may be accessed to monitor delivery of a package at a given receptacle 100 and control overall system 1000 operation. Data may be viewed, for instance, by a computing device 1010, 1012 (mobile or otherwise) via a web browser or other suitable means and/or by a computing device 1010, 1012 having access to server 1014. In accordance with some embodiments, enabling/disabling of receptacle 100, tether system 200, and/or pressure pad 300 tamper alerting may be performed by an authorized user, for example, via an application on a given computing device 1010, 1012 having an interface with server 1014. In accordance with some embodiments, movement or removal of a delivered package 10 from receptacle 100, tether system 200, and/or pressure pad 300 without first unlocking lock 106 may signal to server 1014 that the receptacle 100, tether system 200, and/or pressure pad 300 has been tampered with, and an alert may be generated.

Gateway 1002 may be configured, in accordance with some embodiments, to receive data gathered from receptacle 100 and transmit that data to a server 1014 via internet 1004. To such ends, gateway 1002 may be configured to utilize any one or combination of suitable communication protocols, wired or wireless, such as, for example, Ethernet, Bluetooth, Wi-Fi, and cellular, among others. In accordance with some embodiments, gateway 1002 may be any one, or combination, of fixed Bluetooth-to-Wi-Fi, cellular-to-Wi-Fi, or cellular-to-Bluetooth bridge/hub devices. Gateway 1002 may be used to read all RF signal(s) 101 from receptacle(s) 100 within range and to forward the information over a network interface to internet 1004 and server 1014. In accordance with some embodiments, gateway 1002 may be configured to receive such an RF signal 101 and relay information obtained therefrom to server 1014, providing for a mechanism by which the integrity status of receptacle(s) 100 (and/or other systems 200, 300) of system 1000, in part or in whole, may be determined. In some embodiments in which a given wireless transmitter 152 of a given receptacle 100 is configured to send RF signal 101 as a cellular signal, data therefrom may be sent over a cellular data pathway without involvement of a gateway 1002.

System 1000 may involve use of one or more computing devices 1010, 1012, which may be mobile or otherwise. In accordance with some embodiments, a given computing device 1010, 1012 may be configured for monitoring and controlling operation of any part or the totality of system 1000 and its various constituent elements. To such ends, a given computing device 1010, 1012 may be any one (or combination) of a mobile phone, a smartphone, a tablet computer, a laptop/notebook computer, a sub-notebook computer, a desktop computer, a personal digital assistant (PDA), and a cellular handset. In some cases, a given computing device 1010, 1012 may be a dedicated device configured specifically to communicate with receptacle 100, whereas in some other cases, a given computing device 1010, 1012 may be a general computing device configured for use to such ends, optionally hosting one or more applications to facilitate its use in monitoring and controlling operation of system 1000. A given computing device 1010, 1012 may be configured for communication with server 1014 utilizing wired communication via Universal Serial Bus (USB), Ethernet, FireWire, or other wired communicating interfacing, wireless communication via Wi-Fi, Bluetooth, or other wireless communication interfacing, or a combination of any thereof. In accordance with some embodiments, a given computing device 1010, 1012 may host a browser or other software application configured to facilitate review of information pertinent to receptacle(s) 100 or any other part or the totality of system 1000 and its various constituent elements.

Server 1014, which may be accessible through the internet 1004, may be cloud-based, in part or in whole. As a means of data storage, server 1014 may be (or otherwise may include) a database configured to store information saved thereat, for instance, by any of receptacle(s) 100 and/or computing device(s) 1010, 1012. In accordance with some embodiments, server 1014 may be configured to verify that system 1000 is properly working. In a more general sense, server 1014 may allow for a given desired degree of inter-networking of the components of system 1000 and other elements as part of the internet of things (IOT), in accordance with some embodiments.

Methodologies

Figure 9:
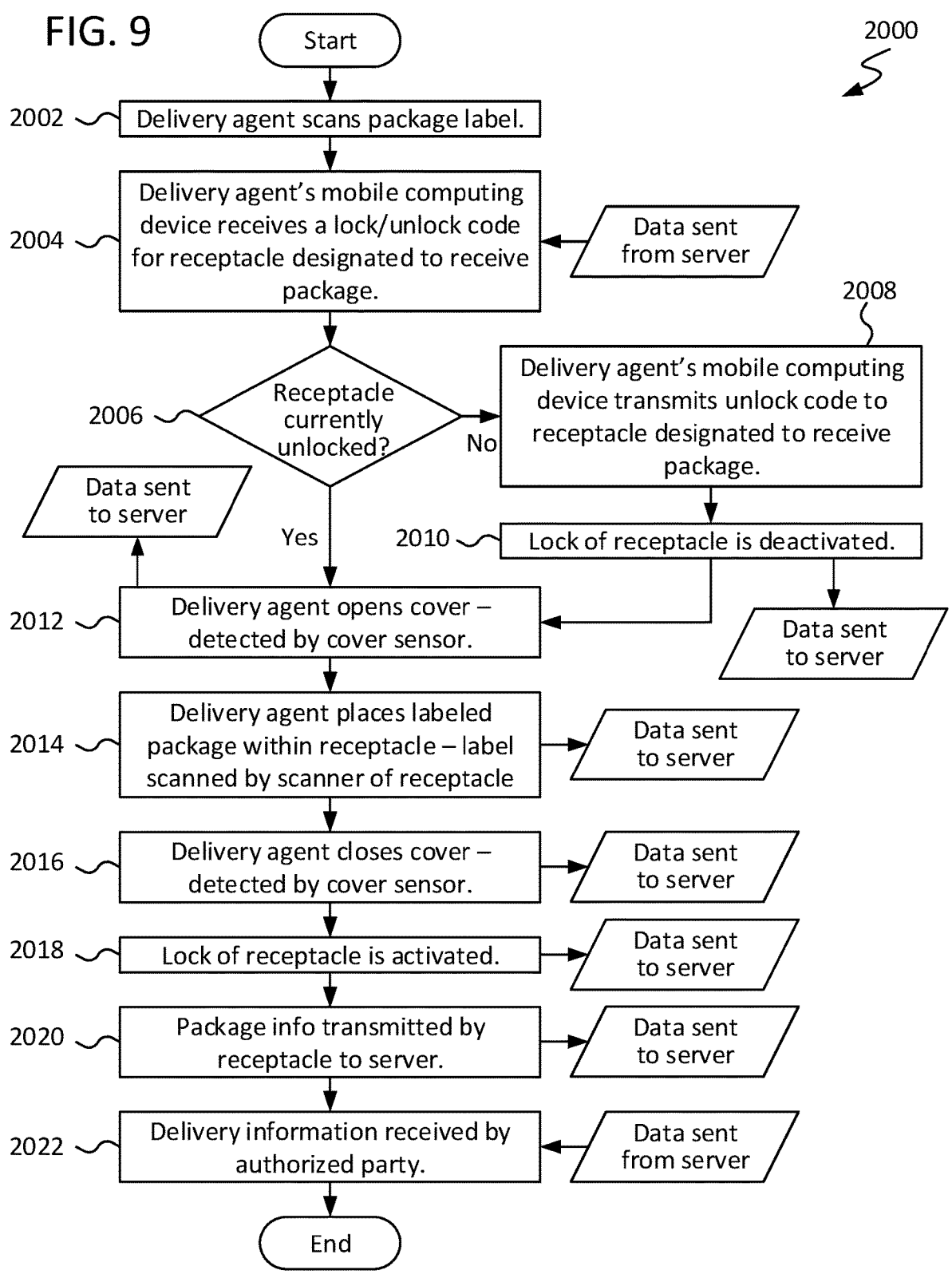
FIG. 9 is a flow diagram illustrating a method of delivering a package to a delivery receptacle, in accordance with an embodiment of the present disclosure.

FIG. 9 is a flow diagram illustrating a method 2000 of delivering a package 10 to a delivery receptacle 100, in accordance with an embodiment of the present disclosure. Method 2000 may begin as in block 2002 with the delivery agent scanning label 12 of package 10. Method 2000 may continue as in block 2004 with the delivery agent's mobile computing device 1010 receiving a lock/unlock code for a receptacle 100 designated to receive package 10. In the process, data may be sent from server 1014. In at least some cases, the lock/unlock code may be a new unique code for one-time use by a delivery agent in locking and/or unlocking lock 106. The lock/unlock code may be sent by server 1014 (e.g., in an encrypted manner) to receptacle 100 and/or computing device 1010. In some instances, the lock/unlock code may be sent by server 1014 to the delivery agent's mobile computing device 1010, for example, based on the delivery agent's location (e.g., latitude and/or longitude) in proximity to the location of the designated receptacle 100.

Method 2000 may continue as in block 2006 with determining whether receptacle 100 is currently unlocked. If receptacle 100 is unlocked, then method 2000 may proceed as in block 2012 (discussed below). If instead receptacle 100 is locked, then method 2000 may proceed as in block 2008 with the delivery agent's mobile computing device 1010 transmitting the unlock code to the receptacle 100 designated to receive package 10. In such case, lock 106 of receptacle 100 may be deactivated, as in block 2010. In the process, data may be sent to server 1014.

As previously noted, method 2000 may continue as in block 2012 with the delivery agent opening cover portion 104 of receptacle 100, which may be detected by cover sensor 172. In the process, data may be sent to server 1014. Method 2000 may continue as in block 2014 with the delivery agent placing the labeled package 10 within receptacle 100 and label 12 being scanned by scanner 162 of receptacle 100. In the process, data may be sent to server 1014. Method 2000 may continue as in block 2016 with the delivery agent closing cover portion 104 of receptacle, which may be detected by cover sensor 172. In the process, data may be sent to server 1014. Method 2000 may continue as in block 2018 with lock 106 of receptacle 100 being activated. In the process, data may be sent to server 1014. In some cases, a new unique unlock code may be transmitted (e.g., in an encrypted manner) to server 1014 each time receptacle 100 is locked. In at least some instances, after activating lock 106, scanner 162 may be put in a low-power state (e.g., a sleep state, hibernation state, or off state) to converse power.

Method 2000 may continue as in block 2020 with information about package 10, such as an identification code obtained from label 12, being transmitted by receptacle 100 to server 1014. In the process, data may be sent to server 1014. Method 2000 may continue as in block 2022 with delivery information (e.g., package ID, delivery time, delivery agent ID) being received by an authorized party (e.g., the owner or monitor of receptacle 100). In the process, data may be sent from server 1014.

Figure 10:
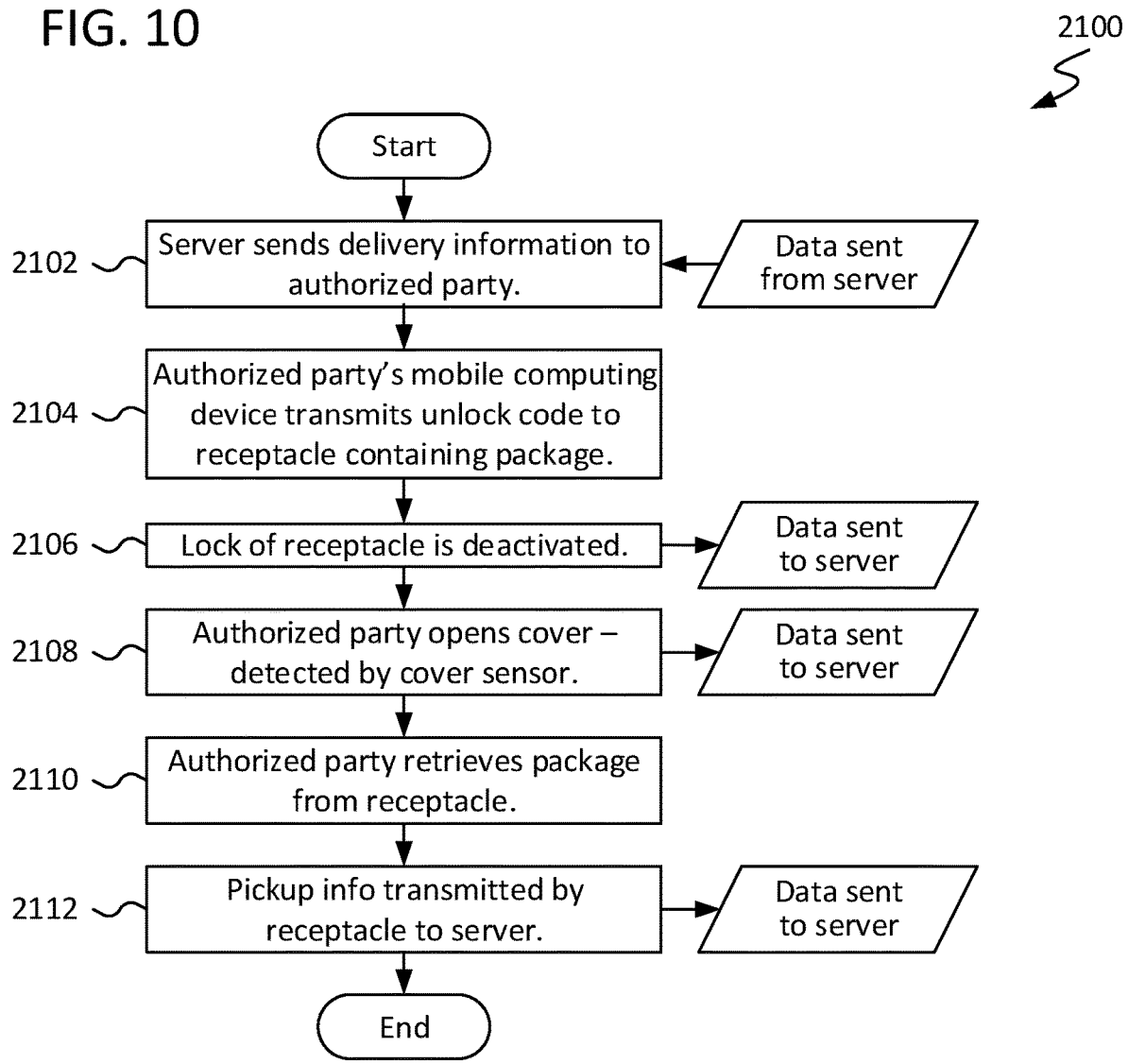
FIG. 10 is a flow diagram illustrating a method of retrieving a delivered package from a delivery receptacle, in accordance with an embodiment of the present disclosure.

FIG. 10 is a flow diagram illustrating a method 2100 of retrieving a delivered package 10 from a delivery receptacle 100, in accordance with an embodiment of the present disclosure. Method 2100 may begin as in block 2102 with server 1014 delivering information to an authorized party (e.g., the owner or monitor of receptacle 100). In the process, data may be sent from server 1014.

Method 2100 may continue as in block 2104 with the authorized party's mobile computing device 1010 transmitting an unlock code to receptacle 100 containing the package 10 to be retrieved. The unlock code may be transmitted by the authorized party's computing device 1010 utilizing any one or combination of Bluetooth, Wi-Fi, and NFC communication. Method 2100 may continue as in block 2106 with lock 106 of receptacle 100 being deactivated. In the process, data may be sent to server 1014. Method 2100 may continue as in block 2108 with the authorized party opening cover portion 104 of receptacle 100, which may be detected by cover sensor 172. In the process, data may be sent to server 1014. Method 2100 may continue as in block 2110 with the authorized party retrieving package 10 from receptacle 100. Method 2100 may continue as in block 2112 with information about the pickup of package 10 (e.g., retrieval time, user ID) being transmitted by receptacle 100 to server 1014. In the process, data may be sent to server 1014.

FIG. 11 is a flow diagram illustrating a method 2200 of preparing and retrieving a package 10 for pickup from a delivery receptacle 100, in accordance with an embodiment of the present disclosure. Method 2200 may begin as in block 2202 with a shipping party preparing a label 12 for a package 10 to be picked up a delivery agent. In the process, data may be sent to server 1014. Method 2200 may continue as in block 2204 with the shipping party placing a labeled package 10 within receptacle 100 and label 12 being scanned by scanner 162 of receptacle 100. In the process, data may be sent to server 1014. Method 2200 may continue as in block 2206 with the shipping party activating lock 106 of receptacle 100 using mobile computing device 1010. In the process, data may be sent to server 1014.

Method 2200 may continue as in block 2208 with the delivery agent receiving information about the package 10 to be picked up from receptacle 100. In the process, data may be sent from server 1014. Method 2200 may continue as in block 2210 with the delivery agent's mobile computing device 1010 receiving an unlock code for the receptacle 100 containing the package 10 for pickup. In the process, data may be sent from server 1014.

Method 2200 may continue as in block 2212 with the delivery agent's mobile computing device 1010 transmitting the unlock code to the receptacle 100 containing the package 10 for pickup. Method 2200 may continue as in block 2214 with lock 106 of receptacle 100 being deactivated. In the process, data may be sent to server 1014. Method 2200 may continue as in block 2216 with the delivery agent opening cover portion 104 of receptacle 100, which may be detected by cover sensor 172. In the process, data may be sent to server 1014. Method 2200 may continue as in block 2218 with the delivery agent retrieving the package 10 from receptacle 100. Method 2200 may continue as in block 2220 with information about the pickup being transmitted by receptacle 100 to server 1014. In the process, data may be sent to server 1014.

Method 2200 may continue as in block 2222 with determining whether the package 10 is ready for delivery. If the package is ready for delivery, the method 2200 may proceed as discussed with respect to method 2000 of FIG. 9. If instead the package is not ready for delivery, method 2200 may terminate.

As will be appreciated in light of this disclosure, techniques and elements described in relation to receptacle 100, tether system 200, pressure pad 300, and system 1000 (more generally) may be utilized with any of a wide range of assets and platforms in any of a wide range of applications and contexts. It should be noted that the present disclosure is not intended to be limited only to delivery receptacles, as in a more general sense, and in accordance with some embodiments, techniques and elements disclosed herein may be utilized with any closeable/sealable container where unrestricted or unauthorized access to contents/assets or theft or damage thereof may be undesirable.

The foregoing description of example embodiments has been presented for the purposes of illustration and description. It is not intended to be exhaustive or to limit the present disclosure to the precise forms disclosed. Many modifications and variations are possible in light of this disclosure.

It is intended that the scope of the present disclosure be limited not by this detailed description. Future-filed applications claiming priority to this application may claim the disclosed subject matter in a different manner and generally may include any set of one or more limitations as variously disclosed or otherwise demonstrated herein.

What is claimed is:

1. A delivery receptacle comprising:
   a body portion configured to receive a package therein;
   a cover portion configured to engage the body portion;
   a lock configured to lock the cover portion in engagement with the body portion; and
   a first electronics assembly comprising:
      a scanner configured to scan a label of the package;
      a first wireless communication device configured to transmit a first radio frequency (RF) signal including data pertaining to delivery information obtained from the label scanned by the scanner, wherein the first RF signal is a Wi-Fi signal or a cellular signal;
      a second wireless communication device configured to communicate with a mobile computing device within range to effectuate locking and unlocking of the lock; and
      a first processor configured to instruct the first wireless communication device to transmit the first RF signal.

2. The delivery receptacle of claim 1, wherein the scanner is a radio-frequency identification (RFID) scanner.

3. The delivery receptacle of claim 2, wherein the first electronics assembly further comprises a first RFID antenna communicatively coupled with the RFID scanner and disposed on a first interior wall of either the body portion or the cover portion.

4. The delivery receptacle of claim 3, wherein the first electronics assembly further comprises a second RFID antenna communicatively coupled with the RFID scanner and disposed on a second interior wall of either the body portion or the cover portion.

5. The delivery receptacle of claim 1, wherein the scanner is a barcode scanner.

6. The delivery receptacle of claim 1, wherein the scanner is configured to scan the label of the package when the package is disposed within the body portion.

7. The delivery receptacle of claim 1, wherein the first electronics assembly further comprises a lock sensor configured to detect whether the lock is locked or unlocked.

8. The delivery receptacle of claim 1, wherein the first wireless communication device is further configured to transmit in the first RF signal data pertaining to at least one of:
   detected tampering with the cover portion or body portion;
   detected tampering with the lock; and
   detected unauthorized removal of the package from the delivery receptacle.

9. The delivery receptacle of claim 1, wherein the delivery information comprises at least one of a package ID, a time of delivery of the package, and a delivery agent ID.

10. The delivery receptacle of claim 1, wherein the first RF signal further includes data pertaining to whether the lock is locked or unlocked.

11. The delivery receptacle of claim 1, wherein the second wireless communication device is configured to receive a near-field communication (NFC) signal from the mobile computing device.

12. The delivery receptacle of claim 1, wherein the second wireless communication device is configured to receive a Bluetooth signal from the mobile computing device.

13. The delivery receptacle of claim 1, wherein the first electronics assembly further comprises a third wireless communication device configured to transmit a second RF signal, wherein the second RF signal is a Bluetooth signal.

14. The delivery receptacle of claim 1, wherein:
   the first electronics assembly further comprises a power supply; and
   the first wireless communication device is further configured to transmit in the first RF signal data pertaining to a remaining power level of the power supply.

15. The delivery receptacle of claim 1, wherein the first electronics assembly further comprises an alarm configured to emit at least one of a visual alarm and an audio alarm in response to at least one of:
   detected tampering with the cover portion or body portion;
   detected tampering with the lock; and
   detected unauthorized removal of the package from the delivery receptacle.

16. A system comprising:
   the delivery receptacle of claim 1; and
   a tether system comprising:
      a tether configured to interface with a package external to the delivery receptacle;
      an attachment point disposed external to the delivery receptacle and configured to have the tether engage therewith; and
      a stowage mechanism configured to stow the tether.

17. The system of claim 16, wherein the tether is a line including a netting material configured to expand out over the package external to the delivery receptacle when deployed.

18. The system of claim 16, wherein the tether includes an electrically conductive trace which is configured to be electrically coupled with the first electronics assembly to form a circuit when the tether engages with the attachment point.

19. The system of claim 16, wherein the first wireless communication device is further configured to transmit in the first RF signal data pertaining to at least one of:
   a breakage of the tether;
   an unauthorized disengagement of the tether from the attachment point; and
   an unauthorized removal of the package interfaced with the tether.

20. The system of claim 16, wherein the tether system further comprises a tether sensor configured to detect whether the tether is engaged or disengaged with respect to the attachment point.

21. The system of claim 16, wherein the stowage mechanism comprises a rotary encoder configured to detect whether the tether retracts or advances in length.

22. A system comprising:
   the delivery receptacle of claim 13; and
   a pressure pad system comprising:
      a pressure pad configured to have disposed thereon a package external to the delivery receptacle; and
      a second electronics assembly comprising:
         a pressure sensor configured to detect a weight of the package disposed on the pressure pad;
         a fourth wireless communication device configured to transmit a third RF signal in communication with the third wireless communication device, wherein the third RF signal is a Bluetooth signal; and a second processor configured to instruct the fourth wireless communication device to transmit the third RF signal.

23. The system of claim 22, wherein the third RF signal includes data pertaining to whether the package external to the delivery receptacle is disposed on the pressure pad.

24. The system of claim 22, wherein the fourth wireless communication device is further configured to transmit in the third RF signal data pertaining to at least one of:
   detected tampering with the pressure pad; and
   detected unauthorized removal of the package from the pressure pad.

25. The system of claim 24, wherein the first wireless communication device is further configured to transmit in the first RF signal the data pertaining to at least one of:
   detected tampering with the pressure pad; and
   detected unauthorized removal of the package from the pressure pad.

* * * * *